United States Patent [19]

Murphy

[11] 4,188,147
[45] Jan. 12, 1980

[54] QUICK SET CLIP FOR PARTITION STUDS
[75] Inventor: Wesley T. Murphy, Auburn, N.Y.
[73] Assignee: E.T.I. Corporation, Auburn, N.Y.
[21] Appl. No.: 964,741
[22] Filed: Nov. 29, 1978
[51] Int. Cl.$^2$ .............................................. F16B 7/04
[52] U.S. Cl. ..................................... 403/230; 403/408; 52/243
[58] Field of Search ............... 403/408, 230, 208, 392, 403/397; 52/489, 241, 243, 703, 712

[56] References Cited
U.S. PATENT DOCUMENTS

| | | | |
|---|---|---|---|
| 1,999,508 | 4/1935 | Matthews | 403/397 X |
| 3,055,686 | 9/1962 | Havener | 403/397 X |
| 3,164,230 | 1/1965 | Adams | 52/712 X |
| 3,356,399 | 12/1967 | Young | 403/397 |
| 3,748,808 | 7/1973 | Sheppard et al. | 403/397 X |

*Primary Examiner*—Wayne L. Shedd
*Attorney, Agent, or Firm*—Bruns & Jenney

[57] ABSTRACT

A structural frame in which vertically aligned metallic studs are secured to horizontal metallic runners or the like by means of clips to create a strong, easy to erect, partition. Each clip includes two upraised legs that are connected at their upper ends by means of a sinusoidal shaped section. The lower end of each leg contains an outwardly extended locking key. In assembly, the sinusoidal section of the clip is received within a slotted hole formed in the stud with the bottom of the slotted hole being seated against one of the peaks of the sinusoidal waveform section. The clip is crimped to allow the keys to pass through a pair of receiving holes formed in the horizontal runner. The crimping force on the clip is released whereupon the locking bars are driven beneath the holes to lock the clip in place and thus secure the two structural members in assembly.

9 Claims, 3 Drawing Figures

QUICK SET CLIP FOR PARTITION STUDS

BACKGROUND OF THE INVENTION

This invention relates to a metallic building frame structure and, in particular, to a clip for securing a vertical stud to a horizontal runner to provide a wall partition or the like. The most pertinent prior art known to the applicant at the time of filing is embodied in U.S. Pat. Nos.

222,590
1,998,688
2,132,832
2,290,002
2,350,093
2,863,184
3,001,615
3,309,825
3,332,188
4,018,020

More specifically, this invention provides a metallic structural element of stated characteristics for establishing a building partition of generally conventional form. As evidenced by the above noted patents, metallic frame structures of this nature have been utilized in the building industry for quite some time because of their generally high strength, lightweight characteristics. However, many of these structures, as well as the procedures needed to erect them, are relatively complex. Similarly, a relatively large number of different building components and special shapes are required to assemble a single partition. As a result, these prior art structures are relatively difficult to erect and oftentimes require specially trained workers to assemble.

SUMMARY OF THE INVENTION

It is an object of the present invention to improve metal frame structures used in the construction industry.

It is a fuurther object of the present invention to provide a simple and dependable means for cojoining the component parts of a structural partition.

A still further object of the present invention is to provide a high strength clip that is capable of securing a vertical stud to a horizontal runner.

Yet another object of the present invention is to improve the holding power of clips used to join metallic building members together in assembly.

These and other objects of the present invention are attained by means of a retaining clip for securely cojoining two metallic structural elements in assembly wherein the clip is formed of a single piece of spring steel that lies within a plane, the clip further having two legs that are joined at one end by means of a sinusoidal shaped section and which further includes two locking keys that depend outwardly from the opposite ends of the legs. In assembly, at least one of the peaks contained in the sinusoidal section is seated within a slotted hole contained in a vertical structural member and the keys are locked within receiving holes formed in a horizontal member to secure the two members in perpendicular alignment in assembly.

BRIEF DESCRIPTION OF THE DRAWINGS

For a better understanding of these and other objects of the present invention, reference is had to the following detailed description of the invention to read in conjunction with the following drawings wherein.

DESCRIPTION OF THE INVENTION

Figure 1:
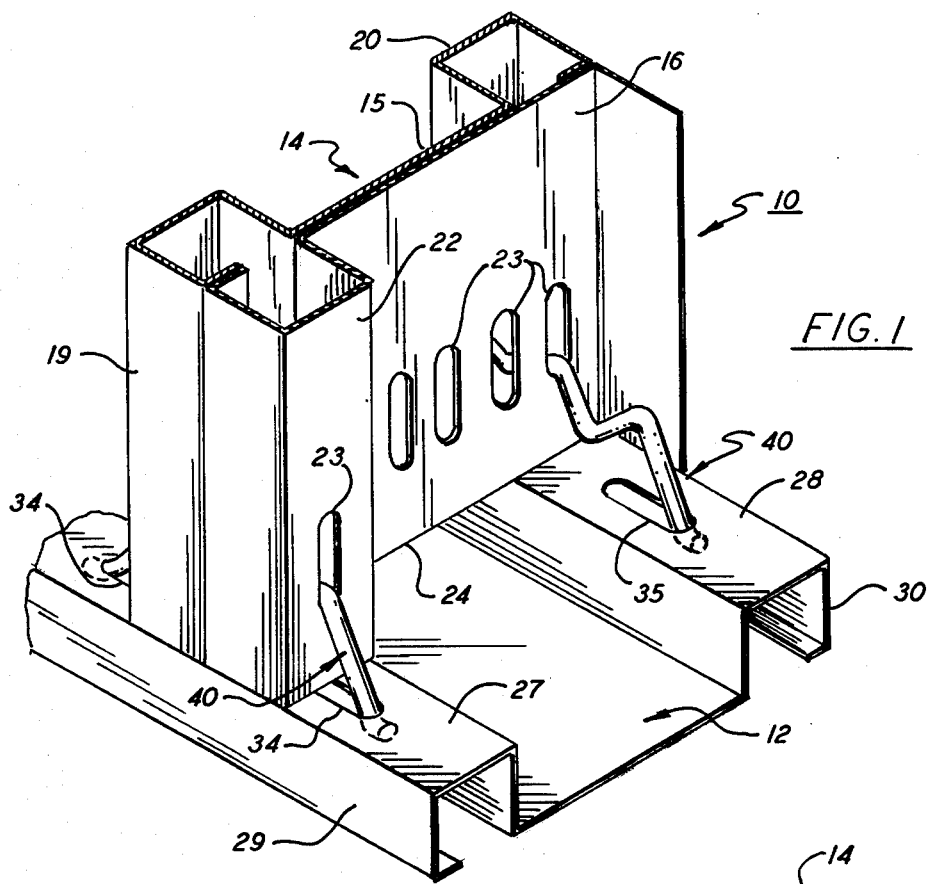
FIG. 1 is a partial perspective view illustrating a vertically aligned stud being secured to a horizontal member by means of a clip embodying the teachings of the present invention.

Referring initially to FIG. 1, there is shown a structural partition, generally referenced 10, wherein 12 is a horizontal runner, such as a floor plate or the like, and 14 is a vertically aligned stud. Both the horizontal and vertical members are roll formed from metallic blanks to provide a relatively lightweight, high strength assembly. Although only one vertical stud and one horizontal member are herein shown joined together, it should be understood from the disclosure below that structural elements of similar construction may be brought together using the joining technique of the present invention to formulate many different types of building partitions upon which doors, windows and the like may be suspended.

Although not important for the purposes of the present invention, the stud 14 is shown as being made up of two individual flanged elements 15 and 16 whose webs are placed in back-to-back relationship in assembly. For explanatory purposes, member 15 is shown as having two rectangular end flanges 19,20 while the second stud element 16 contains a single rectangular end flange 22. In practice, the lateral depth of each flange, that is, the depth as measured from the web of each member over the top surface of the flange, is held to approximately the same dimension. A series of vertically aligned slotted holes 23—23 are passed horizontally through both the web and flange sections of the stud assembly. The bottom wall of each of the slotted holes is located at a predetermined height above the lower end 24 of the stud assembly.

The horizontal runner 12 is shown as a double flanged element that is similar to element 15 in the vertical stud assembly. As illustrated, the runner is placed with the web side away from the stud whereby the end wall 24 of the stud rests upon the top surfaces 27 and 28 of the two opposed flanges 29 and 30, respectively. Each flange contains at least one coacting pair of receiving holes centrally located in the top surface thereof with the holes formed in flange 29 being noted as 34—34 and those formed in flange 30 noted as 35—35. In assembly, the stud is positioned crosswise upon the runner with the stud being located about midway between a pair of receiving holes contained in each flange.

Figure 2:
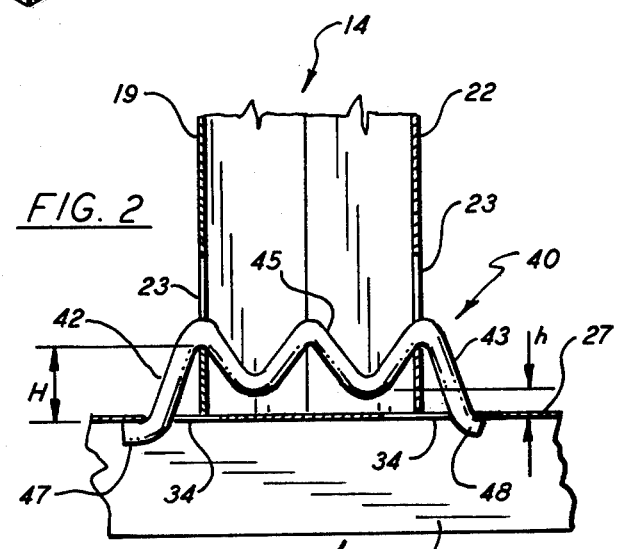
FIG. 2 is a front elevation in section of the cojoined members illustrated in FIG. 1 showing the clip in greater detail.
Figure 3:
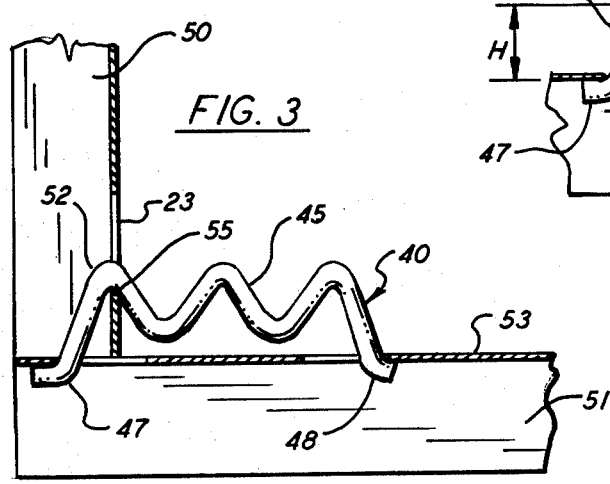
FIG. 3 is a second front elevation further illustrating the clip being utilized to secure a corner stud to a horizontal plate.

As best seen with reference to FIG. 2, a pair of quick set clips 40—40 are utilized to secure the vertical stud to the horizontal runner in assembly. Each clip includes a pair of upraised legs 42,43 that are cojoined at the upper or proximal ends by means of a sinusoidal shaped section 45. The waveform of the sinusoidal section contains three peaks and two valleys as best seen in FIGS. 2 and 3. The sinusoidal section is joined to the proximal ends of the upraised legs at the apex of the two outer peaks. The waveform of the section thus describes one full cycle between the two legs. A pair of horizontally extended locking keys 47 and 48 depend outwardly from the distal ends of the two legs. The left-hand key 47, as viewed in FIG. 2, is of relatively greater length than the right-hand key 48. The reason for this shall become apparent from the disclosure below.

In assembly, the clip is positioned within the slotted holes 23—23 formed in the stud and the locking keys passed through a cooperating pair of mounting holes formed in the runner 12. In practice, the distance across the roots of the clip, as measured over the legs at their distal ends, is slightly greater than the overall distance between the two end walls of the mounting holes. To set the clip in assembly, the longer key is first inserted into one of the mounting holes and the clip is then crimped, using an appropriate crimping tool, along its length to allow the shorter key to pass through the second mounting hole. Upon releasing the force on the clip, the keys are driven outwardly under the top surface of the receiving flange thereby causing the legs to be biased against the end walls of the two mounting holes.

At least one of the peaks of the sinusoidal section is arranged to loop over the bottom surface of one of the slotted holes formed in the stud. The vertical distance H between the top of the locking keys and the bottom of the peak (FIG. 2) is controlled so that the peak rests in contact against the bottom of the slotted hole 23, thereby pulling the stud into seating contact with the runner. The vertical height h between the tops of the keys and the valleys of the sinusoidal waveform is also controlled to prevent the clip from bottoming against the runner in assembly.

As best seen in FIG. 2, the lateral depth of the flanges contained in the stud generally corresponds to the distance between the peaks found in the sinusoidal section of the clip. Accordingly, the clip is able to actively engage both outer walls of the two opposed stud flanges to securely seat the stud in perpendicular alignment upon the runner. It should be noted that the vertical holes in the stud, the mounting holes in the runner and the clip all are centered within a common vertical plane in assembly whereby movement of the members in any direction will be resisted by the key.

Referring now to FIG. 3, there is shown another embodiment of the invention wherein the clip 40 is employed to secure a corner stud 50 to the flanged surface of horizontal runner 51. In this particular arrangement, the last peak 52 of the sinusoidal section is placed in engagement with the outer hole 23 formed in the stud. As can be seen, the stud is supported close to the point at which the extended key 47 passes under the flange surface 53. In this configuration, the clip is arranged to act as a lever with the fulcrum point 55 being close to the stronger of the two locking keys. The shorter locking key 48 is thus positioned some greater distance from the fulcrum point which considerably enhances its holding power. The pull out strength of the key 48 is increased by an amount that is proportional to the ratio of the length of the arms acting between the two keys. Accordingly, the clip can be utilized to provide an extremely strong device for anchoring a corner stud or the like in assembly and thus prevents the stud from lifting vertically from the runner. This particular arrangement is also ideally well suited for use in a location where the amount of working space is limited.

While this invention has been described with reference to the disclosure set forth above, it is not necessarily limited to this particular embodiment and this application is intended to cover any modifications or changes as may come within the scope of the present invention.

I claim:

1. A clip for fastening metallic studding in place upon metallic runners, the clip including a single piece of high strength resilient material which lies within a single plane, the clip having two legs that are inclined within the plane and which slope towards each other from their respective distal ends toward their respective proximal ends, a sinusoidal shaped section cojoining the proximal ends of the legs, and extended locking keys depending outwardly from the distal end of said legs wherein the peaks and the valleys of said sinusoidal section are positioned a predetermined height above the top surface of said keys.

2. The clip of claim 1 wherein the clip is formed from a single piece of spring steel.

3. The clip of claim 1 wherein the extended length of one key is greater than the extended length of the opposite key.

4. The clip of claim 1 wherein the sinusoidal section is joined to the proximal end of each leg at one of the peaks of said section.

5. The clip of claim 4 wherein the sinusoidal section represents one complete cycle having three peaks and two valleys.

6. In a frame structure employing metallic members, the frame including
   a horizontal runner having a raised flange containing a pair of longitudinally aligned holes formed in one wall of the flange,
   a vertical stud having one end disposed crosswise of the runner between the two holes formed in said flange, the stud containing at least one vertical slotted hole passing horizontally therethrough with the slotted hole being centered in the vertical plane containing said two holes formed in said flange,
   a clip formed of a single piece of high strength resilient material that lies in said plane, the clip further includes two legs rising upwardly from the wall of said flange that are cojoined at the raised ends by a sinusoidal shaped section passing through the slotted hole with the bottom of said slotted hole residing in contact with one of the peaks of said sinusoidal section, the lower ends of said legs having extended locking keys depending outwardly therefrom with each key passing through one of said holes formed in said flange and resting in contact against the inside surface of said wall.

7. The frame structure of claim 6 wherein the overall distance between the lower ends of said clip legs is greater than the overall distance over the flange holes whereby the clip is mounted in pressure contact against the walls of said holes.

8. The frame structure of claim 6 wherein the stud contains a plurality of horizontally aligned slotted holes vertically spaced at a distance equal to the wave frequency of the sinusoidal section whereby the bottom of each hole resides in contact with one peak of said sinusoidal section.

9. The frame structure of claim 6 wherein the legs are inclined from the key ends toward the sinusoidal section and the sinusoidal section is joined to each leg at one peak of its waveform.

* * * * *